INVENTOR.
GERALD J. ERICKSON

BY Griffin and Stokes
ATTORNEYS

July 20, 1965 G. J. ERICKSON 3,196,259

PARITY CHECKING SYSTEM

Filed May 9, 1962 6 Sheets-Sheet 3

United States Patent Office 3,196,259

Patented July 20, 1965

3,196,259

PARITY CHECKING SYSTEM

Gerald J. Erickson, St. Paul, Minn., assignor to Sperry Rand Corporation, New York, N.Y., a corporation of Delaware Filed May 9, 1962, Ser. No. 193,471
11 Claims. (Cl. 235—153)

The present invention relates to devices for generating the parity of numbers. More particularly, the present invention provides means for adapting a carry-store-add type binary multiplier to generate the parity of a binary number as a result of a series of half-add operations.

Widesepread use is made of parity checking for checking the accuracy of computers and data processors. Each word or other block of information is sensed to determine the number of binary ones it contains. If it has an even number of ones it is considered to have an even parity and if it has an odd number of ones it is considered to have an odd parity. An additional bit called a parity bit is assigned to each number so that the total number of binary bits including the parity bit is always, for example, even. After each data transfer operation the block of information and its parity bit are checked to insure that a zero was not improperly transferred as a one or that a one was not transferred as a zero. In many instances this check is accomplished by again generating a parity bit for the block of information and comparing it with the parity bit transferred with the data.

Many devices exist for generating the parity bit of a block of information. In its simplest form the parity generator may take the form of a module-two counter to which the individual bits of information are applied one at a time. While this device requires a minimum amount of hardware the resulting savings in cost is gained at the expense of lost speed. On the other hand, the parity generator may take the form of a matrix or large translator to which the bits of information are applied simultaneously. While this form of parity generator has a high operating speed it is expensive and requires a large amount of additional circuitry which may also be the source of errors.

Therefore, an object of this invention is to provide a parity generator for a data processing system said parity generator being capable of generating parity bits at relatively high speed yet requiring only a small amount of hardware in addition to that already present in the data processor.

There exists in the prior art a multiplier of the carry-store-add type having first and second half-adders with means for storing the sums without carry and the carries produced by each half-adder. These elements are interconnected so that they may add successive partial products to previous partial products which have been shifted to the right two places. The present invention provides means for modifying the control circuits of a multiplier of this type whereby it may be utilized to generate the parity of a binary number.

Consider for the moment the generation of the parity of the number $A=110100$. The number is shifted to the left on binary order and half-added to itself. That is, the two numbers are added but carries are ignored. The addition is as follows:

| $A_5$ | $A_4$ | $A_3$ | $A_2$ | $A_1$ | $A_0$ | |
|---|---|---|---|---|---|---|
| 1 | 1 | 0 | 1 | 0 | 0 | A |
| 1 | 0 | 1 | 0 | 0 | 0 | A left shifted |
| 0 | 1 | 1 | 1 | 0 | 0 | first result |

↑ (bit 2) parity of A0 and A1
↑ (bit 4) parity of A2 and A3
↑ (bit 6) parity of A4 and A5

If zero is considered to represent even parity and one is considered to represent odd parity, it is seen that the second bit of the result represents the parity of the low order pair of bits of A, the fourth bit represents the parity of the next pair of bits, and the sixth bit represents the parity of the high order pair.

Assume now that the result of the first half-add operation is effectively right shifted two binary orders and a second half-add is performed.

| $A_5$ | $A_4$ | $A_3$ | $A_2$ | $A_1$ | $A_0$ | |
|---|---|---|---|---|---|---|
| 0 | 1 | 1 | 1 | 0 | 0 | first result |
| 0 | 0 | 0 | 1 | 1 | 1 | first result shifted |
| 0 | 1 | 1 | 0 | 1 | 1 | second result |

↑ (bit 4) parity of A2, A3, A4, A5

Bit four represents the parity of bits A2 through A5.

If the result of the second half-add operation is effectively right shifted two binary orders and half-added to the result of the first half-add operation the parity of the number is indicated by the second bit of the third result.

| $A_5$ | $A_4$ | $A_3$ | $A_2$ | $A_1$ | $A_0$ | |
|---|---|---|---|---|---|---|
| 0 | 1 | 1 | 1 | 0 | 0 | first result |
| 0 | 0 | 0 | 1 | 1 | 0 | second result shifted |
| 0 | 1 | 1 | 0 | 1 | 0 | third result |

↑ (bit 2) parity of bits A0 through A5

From the above discussion it becomes obvious that certain carry-store-add multipliers contain the registers and data transfer circuitry necessary for generating the parity of a binary number. Accordingly, an object of this invention is to provide the control circuits for controlling the data transfers between registers in a multiplier whereby said registers generate a parity bit.

An object of this invention is to provide means for generating the parity of a binary number, said means comprising means for left shifting said number and adding the left shifted number to the unshifted number to thereby obtain a first result wherein succeeding even numbered bits thereof indicate the parity of succeeding pairs of bits in the binary number.

An object of this invention is to provide means for generating the parity of a binary number, said means comprising means for left shifting said binary number one binary order and half-adding it to itself to obtain a first result, means for effectively right shifting said first result two binary orders to the right, and means for half-adding said first result and said shifted first result to obtain a second result.

An object of this invention is to provide means for generating the parity of a binary number, said means comprising means for left shifting said binary number one binary order and half-adding it to itself to obtain a first result, means for right shifting said first result two binary orders to the right and half-adding the shifted result to the unshifted result to obtain a second result, and means for effectively shifting said second result two binary orders to the right and half-adding it to the first result to produce a third result.

It is obvious from the example given above that for words having more than six binary bits the third result contains one parity indicating bit for each group of six bits. By performing further half-add operations to obtain further results the number of parity indicating bits can be reduced.

However, after three half-add operations have been performed the number of parity indicating bits is reduced to six for a 36-bit binary number. These six bits may be translated with a relatively minor amount of circuitry to indicate an even or odd parity. Of course further right shift and half-add operations may be performed but the process becomes unduly time consuming.

Accordingly a further object of the invention is to provide means for performing a series of right shift and half-add operations as described above to obtain a result wherein predetermined bits thereof indicate the parities of groups of bits with a binary number, and means responsive to said predetermined bits for indicating the parity of said number.

Further objects of the invention and its mode of operation will become apparent upon consideration of the following description and the accompanying drawings in which.

In the following description the symbols N, $\overline{\text{O}}$, $\overline{\text{A}}$ and FF are used to designate NOT, Negative OR, Negative AND and flip-flop, respectively.

The NOT circuit performs a signal inversion and may be an inverter of known design.

The Negative OR circuit has two or more input leads and an output lead. It produces a negative output signal only when one or more of its inputs is positive. It may be a conventional inverter having two or more input leads.

The Negative AND circuit may be of the same construction as the Negative OR, the distinction being merely a matter of logical definition. The Negative AND produces a positive output signal only when all of its inputs are negative.

The bistable flip-flop may comprise two Negative OR circuits each having an output connected to an input of the other.

The present invention may be utilized to the greatest advantage in a computer having binary multiplier means as described in copending application Serial No. 193,472, filed May 9, 1962, hereinafter referred to as copending application A. The binary multiplier disclosed therein may, with the addition of a relatively minor amount of control circuitry as shown by the present disclosure, be adapted to generate the parity of a binary number.

Figure 1A:
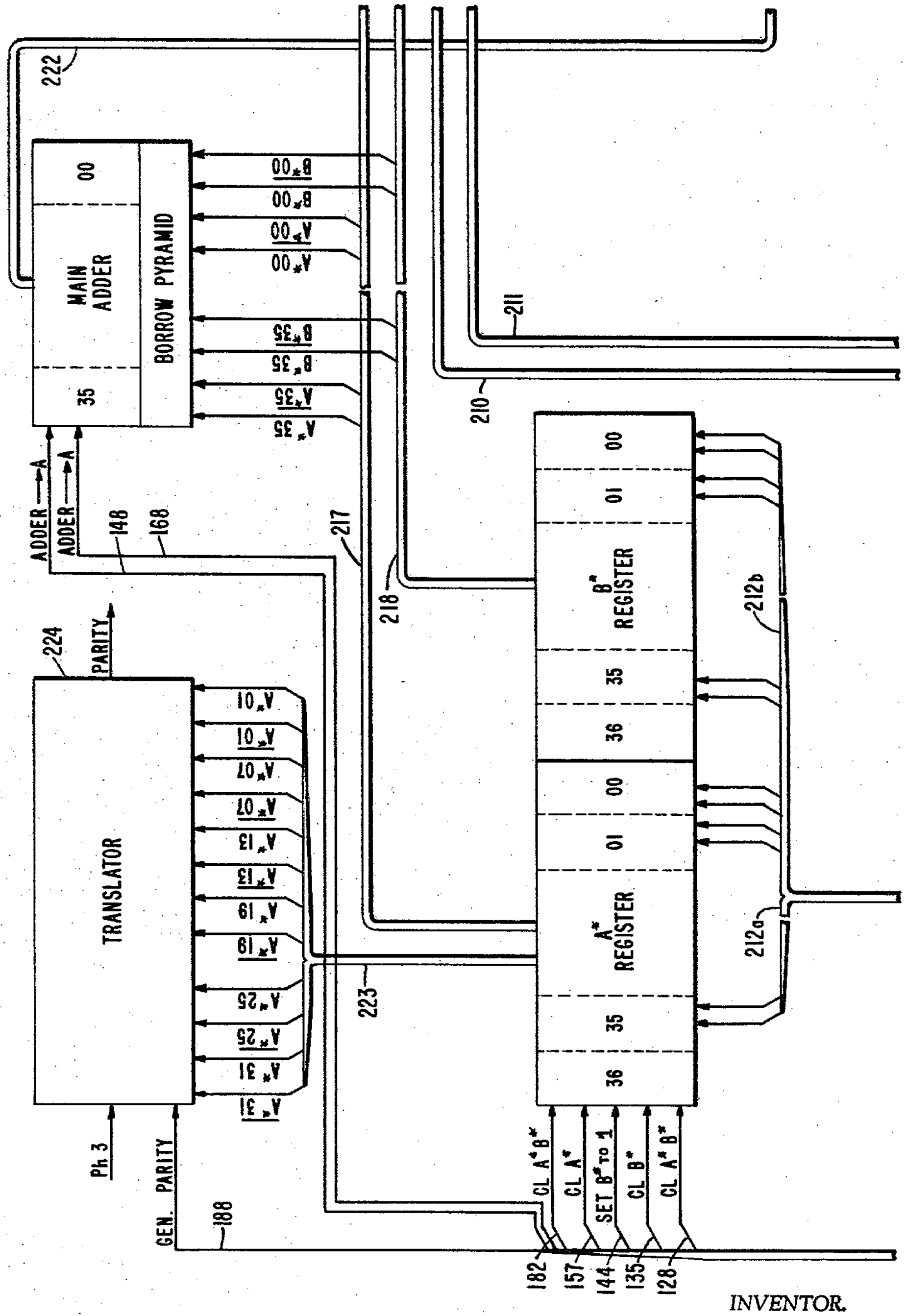
FIGURE 1 is a block diagram of the invention.
Figure 1B:
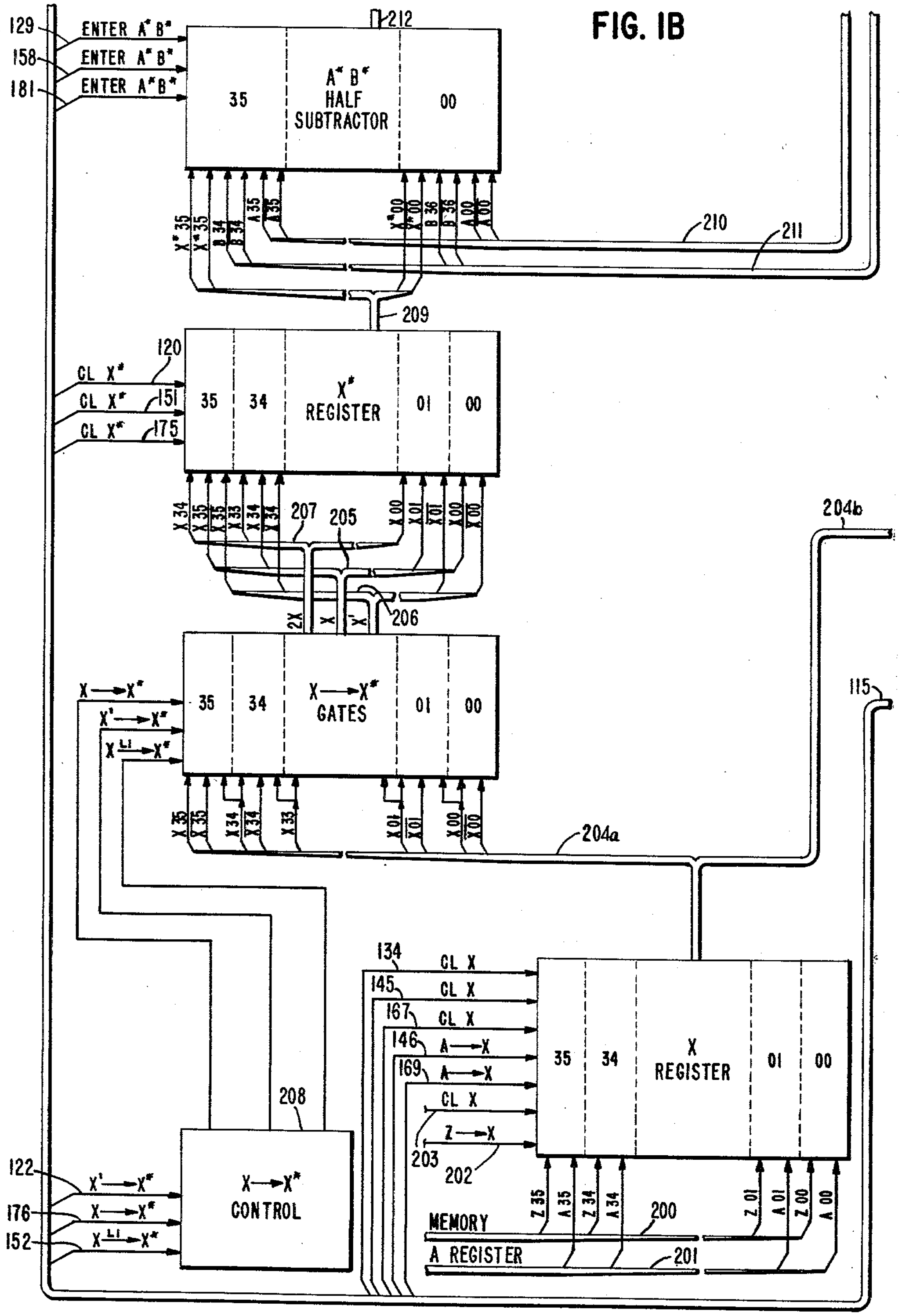
Figure 1C:
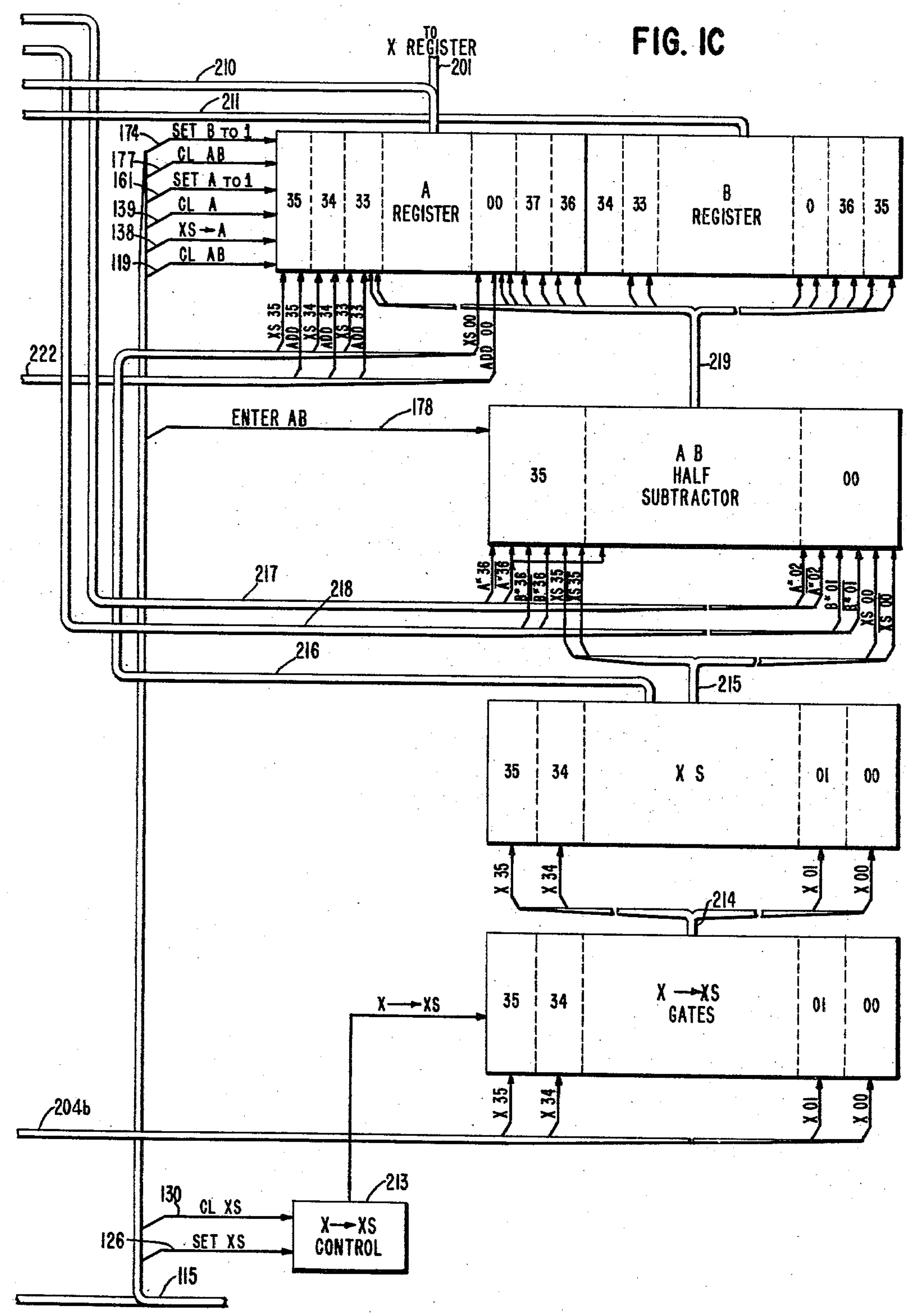

Accordingly, reference may be made to copending application A for details of the X, X*, XS, A*, B*, A, and B registers, the 1X, 2X, X′ controls, the X to X* gates, the X to XS gates, the A*B* and AB half-subtractors and the main subtractor and borrow pyramid shown in block form in FIGURE 1 of the instant application. As an aid in correlating the two disclosures the command signal leads shown in FIGURE 1 have been assigned the same reference numerals as they bear in the copending application.

Figures 2A, 3, 4:
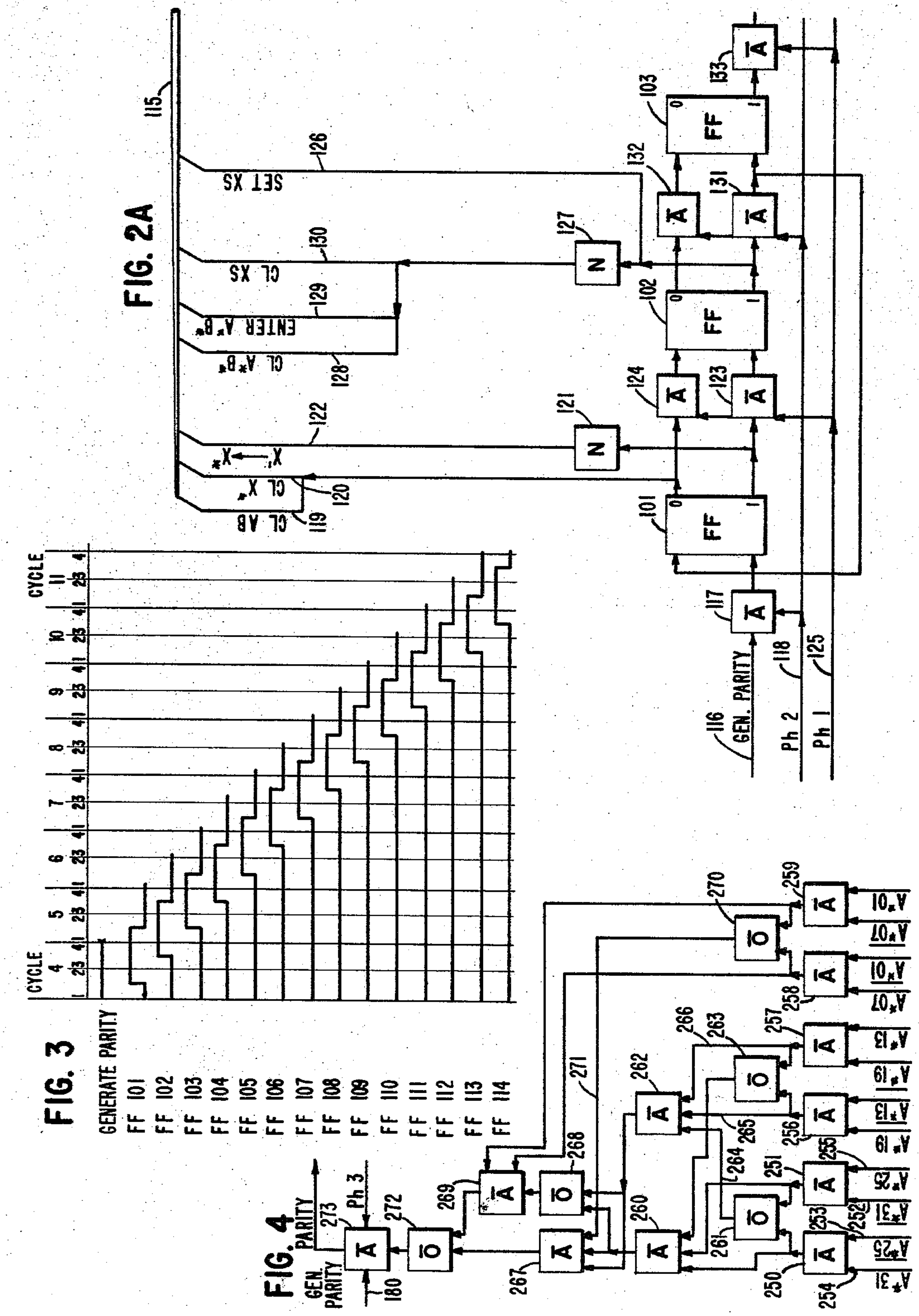
FIGURE 3 is a timing chart illustrating the operation of the command generator; and, FIGURE 4 shows a parity translator circuit.
Figure 2B:
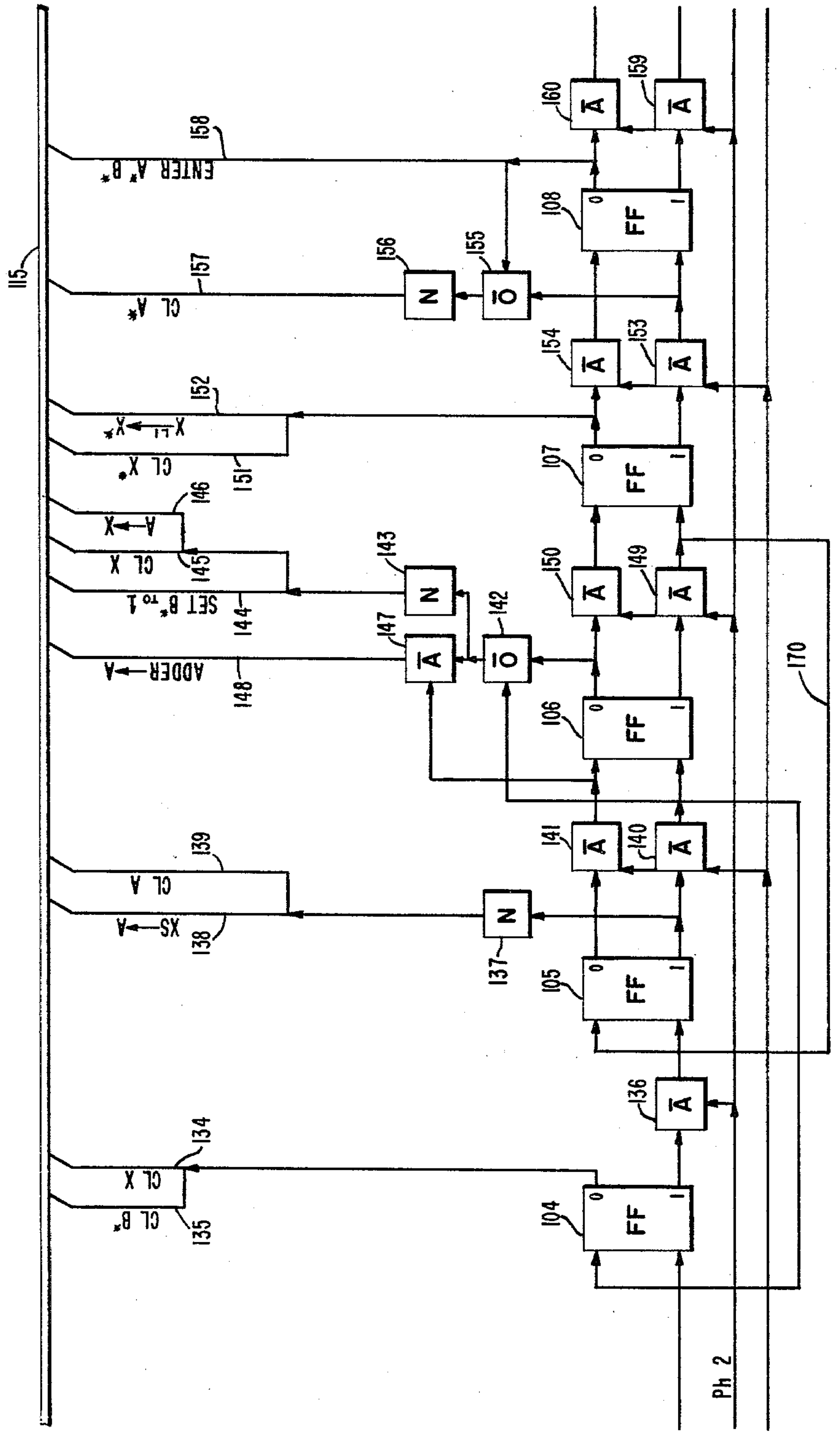
FIGURE 2 shows the command generator.
Figure 2C:
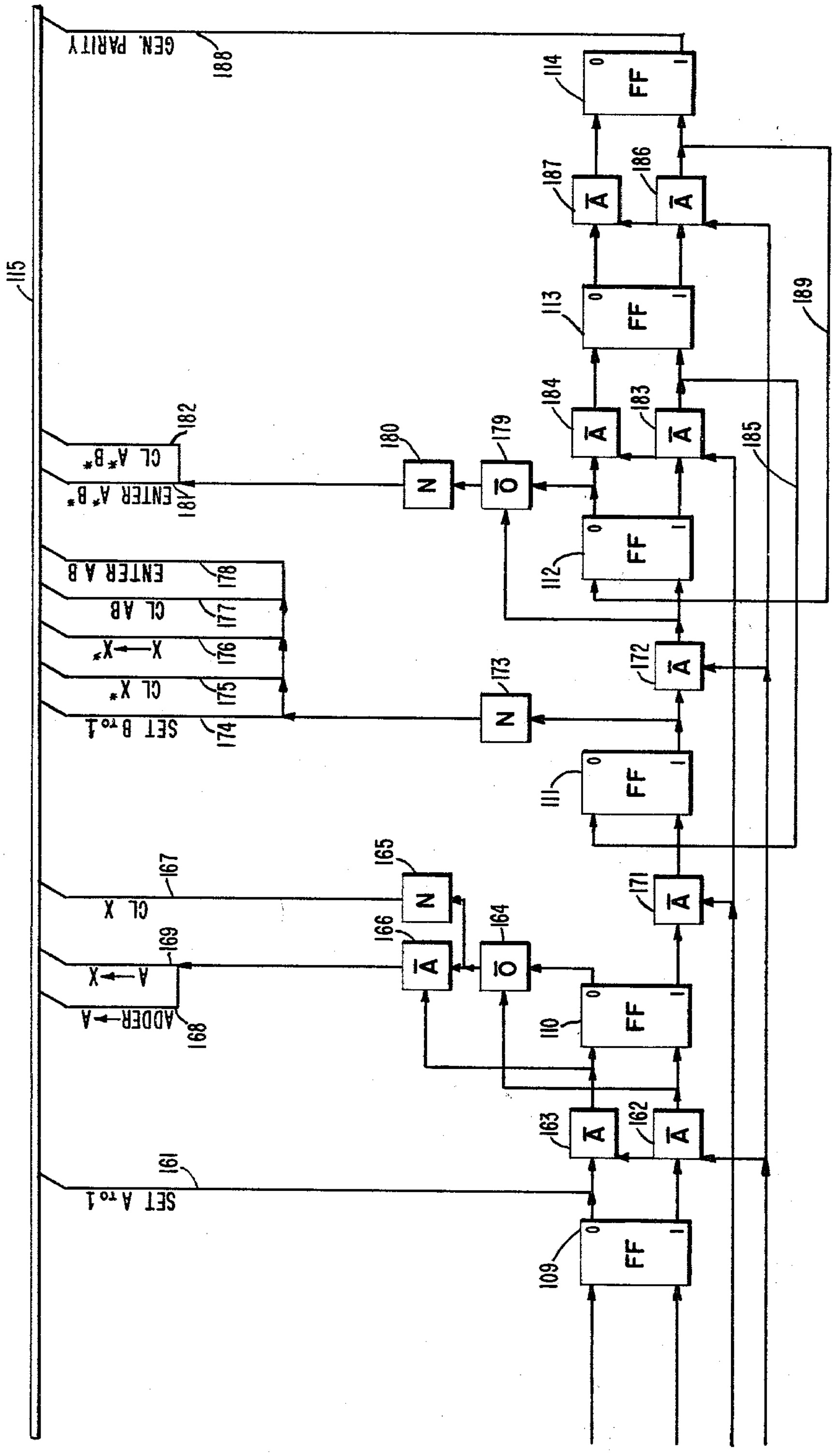

Referring now to FIGURE 2, the command generator comprises a series of bistable flip-flops 101 through 114. These flip-flops generate the commands which are applied to the individual elements of FIGURE 1 over the bus 115. As explained in copending application A, the system is designed to operate during a plurality of cycles each having four phases. Each phase is defined by a negative clock pulse generated by a clock pulse generator of conventional design. The clock or phase pulses are applied to the control circuits of the individual registers where they gate the commands generated by the command generator to the registers at specific times.

The instruction Generate Parity is produced during cycle 4 by the main computer controls (not shown), cycles 1 through 3 being used for decoding the instruction and performing the usual housekeeping operations of the computer. The instruction is applied over lead 116 to $\overline{\text{A}}$117 which also receives a negative phase 2 clock pulse over lead 118. Therefore, during time 42 (cycle 4, phase 2) $\overline{\text{A}}$117 produces a positive output signal to set FF101.

When FF101 is set it produces a positive signal off the reset side. This signal becomes the command Clear AB on lead 119 and the command Clear X* on lead 120. The output from the set side of FF101 is inverted at N121 to become the command X′ to X* on lead 122.

The set output of FF101 is connected to $\overline{\text{A}}$123 while the reset output is connected to $\overline{\text{A}}$124. Both gates are conditioned during phase 4 of each cycle by clock pulses appearing on lead 125. Therefore, during phase 4 of the cycle following that in which FF101 is set $\overline{\text{A}}$123 produces a positive output signal to set FF102. When FF102 is set at time 44 the negative signal appearing on lead 126 becomes the command Set XS. The negative signal from the set side of FF102 is inverted at N127 to become the commands Clear A*B*, Enter A*B* and Clear XS which appear on the leads 128, 129 and 130, respectively.

The set and reset outputs of FF102 are connected to a pair of gates $\overline{\text{A}}$131 and $\overline{\text{A}}$132, respectively. These gates are further conditioned by a clock pulse appearing on lead 118 during phase 2 of each cycle. At time 52 $\overline{\text{A}}$131 produces a positive output signal to set FF103. The output of $\overline{\text{A}}$131 is also connected to the reset input of FF101 so that this flip-flop is reset at the begining of time 52. When FF101 is set the negative signal off the reset side conditions one input of $\overline{\text{A}}$124 and at time 54 the clock pulse appearing on lead 125 passes through $\overline{\text{A}}$124 to reset FF102.

When FF102 is reset at time 54 the negative signal off the reset side conditions one input of $\overline{\text{A}}$132 and at time 62 the clock pulse appearing on lead 118 passes through $\overline{\text{A}}$132 to reset FF103.

FF103 produces no commands utilized for carrying out the parity generating operation. The set output of the flip-flop is connected to one input of a gate $\overline{\text{A}}$133 and conditions this gate from time 52 to 62. Phase 4 clock pulses are applied to the gate over lead 125 so that during time 54 the gate produces a positive output signal to set FF104.

The positive signal off of the reset side of FF104 becomes the command Clear X on lead 134 and the command Clear B* on lead 135. The set side of FF104 is connected to one input of a gate $\overline{\text{A}}$136. This gate is further conditioned by a clock pulse appearing during phase 2 of each cycle so at time 62 the gate produces a positive output signal to set FF105.

When FF105 is set the negative signal off the set side is inverted at N137 to become the command XS to A appearing on lead 138 and the command Clear A appearing on lead 139. The set and reset outputs of FF105 are connected to gates $\overline{\text{A}}$140 and $\overline{\text{A}}$141, respectively. These gates are further conditioned by phase 4 clock pulses so at time 64 $\overline{\text{A}}$140 produces a positive output signal. The output of $\overline{\text{A}}$140 is connected to the set input of FF106, the reset input of FF104 and $\overline{O}$142. Therefore, at time 64 FF104 is reset and FF106 is set.

The positive output from $\overline{A}$140 is inverted at $\overline{O}$142, and inverted again at N143 to become the commands Set B* to 1, Clear X, and A to X. The negative output from $\overline{O}$142 conditions one input of $\overline{A}$147. The output of $\overline{A}$141 is negative as long as FF105 is set and this signal is applied to a second input of $\overline{A}$147 causing it to produce the command Adder to A on lead 148.

As soon as FF106 is set the positive signal off the reset side performs the same function as the positive output from $\overline{A}$140. That is, it is inverted at $\overline{O}$142 to condition $\overline{A}$147 to produce the command on lead 148 with the output of $\overline{O}$142 being inverted again at N143 to produce the commands on leads 144, 145 and 146.

The set and reset outputs of FF106 are applied to $\overline{A}$149 and $\overline{A}$150, respectively. These gates are further conditioned by phase 2 clock pulses so at time 72 $\overline{A}$149 produces a positive output signal to set FF107.

When FF107 is set the positive signal off the reset side becomes the commands Clear X* and X to X* (L1) appearing on the leads 151 and 152. The set and reset output terminals of FF107 are connected to a pair of gates $\overline{A}$153 and $\overline{A}$154, respectively. These gates are further conditioned by phase 4 clock pulses so during time 74 $\overline{A}$153 produces a positive output signal to set FF108. The output of $\overline{A}$153 is inverted at $\overline{O}$155, inverted again at N156 and becomes the command Clear A* on lead 157.

When FF108 is set the positive output from the reset side is applied to $\overline{O}$155 to produce the command Clear A*. The positive output from the reset side of FF108 becomes the command Enter A*B* on lead 158.

The set and reset output terminals of FF108 are connected to a pair of gates $\overline{A}$159 and $\overline{A}$160, respectively. These gates are further conditioned by phase 2 clock pulses so at time 82 $\overline{A}$159 produces a positive output signal to set FF109. The resulting positive output signal from the reset side of FF109 becomes the command Set A to 1 appearing on lead 161. The set and reset output terminals of FF109 are connected to a pair of gates $\overline{A}$162 and $\overline{A}$163, respectively. These gates are further conditioned by phase 4 clock pulses so at time 84 $\overline{A}$162 produces a positive output signal to set FF110. The output of $\overline{A}$162 is also applied to $\overline{O}$164. The output of $\overline{O}$164 is applied to N165 and $\overline{A}$166. Therefore, during time 84 the positive output of $\overline{A}$162 is inverted at $\overline{O}$164, inverted again at N165, and becomes the command Clear X on lead 167. The negative output from $\overline{O}$164 conditions one input of $\overline{A}$166. With FF109 set the output of $\overline{A}$163 is negative thus conditioning the second input of $\overline{A}$166. Therefore, $\overline{A}$166 produces the commands Adder to A and A to X on the leads 168 and 169, respectively. When FF110 is set the positive output from the reset side serves the same function as the positive output from $\overline{A}$162. Thus the commands Adder to A, A to X, and Clear X are generated as long as FF110 is set.

The output of $\overline{A}$149 initiates the resetting operation in which the flip-flops 105 through 110 are reset in sequence. The output of $\overline{A}$149 is connected by way of lead 170 to the reset input of FF105 so that the flip-flop is reset when $\overline{A}$149 produces a positive output signal at time 72. When FF105 is reset it conditions $\overline{A}$141 and at time 74 this gate produces a positive output signal to reset FF106. When FF106 is reset the negative signal from the reset side conditions $\overline{A}$150 so that at time 82 this gate produces a positive output signal to reset FF107. The resulting negative output from the reset side of this flip-flop conditions $\overline{A}$154 and at time 84 this gate produces a positive output signal to reset FF108.

When FF108 is reset it conditions one input of $\overline{A}$160. At time 92 the clock pulse applied to $\overline{A}$160 passes through the gate and resets FF109. The resulting negative signal off the reset side of FF109 conditions $\overline{A}$163 and at time 94 this gate produces a positive output signal to reset FF110.

During the time FF110 is set it applies a negative signal to one input of $\overline{A}$171. At time 92 a clock pulse applied to the second input of this gate passes through the gate to set FF111. The output of FF111 is connected to $\overline{A}$174 and N173. Therefore, while FF111 is set N173 produces the positive commands Set B to 1, Clear X*, X to X*, Clear AB and Enter AB on the leads 174 through 178.

During phase 4 of the cycle in which FF111 is set a clock pulse is applied to $\overline{A}$172 and since the gate is conditioned by the output of FF111 it produces a positive output signal to set FF112. The output of $\overline{A}$172 is inverted at $\overline{O}$179, inverted again at N180, and becomes the commands Enter A*B* and Clear A*B*. As soon as FF112 is set the positive output from the reset side is applied to $\overline{O}$179 so that the commands Enter A*B* and Clear A*B* are generated even after the output of $\overline{A}$172 becomes negative at the end of time 94.

The set and reset output terminals of FF112 are connected to a pair of gates $\overline{A}$183 and $\overline{A}$184, respectively. These gates are further conditioned by phase 2 clock pulses. During phase 2 of cycle 10 $\overline{A}$183 produces a positive output signal to set FF113. The output of $\overline{A}$183 is also applied by way of lead 185 to the reset input terminal of FF111 to reset this flip-flop.

FF113 produces no commands for controlling the parity generating operation. The set and reset output terminals of this flip-flop are connected to a pair of gates $\overline{A}$186 and $\overline{A}$187, respectively. These gates are further conditioned by phase 4 clock pulses so that during phase 4 of the tenth cycle $\overline{A}$186 produces a positive output signal to set FF114. The resulting negative signal off the set side of this flip-flop is the command Generate Parity.

A positive output signal from $\overline{A}$186 initiates a sequence of operations to reset flip-flops 112 through 114. The signal is applied by way of lead 189 to the reset input of FF112. When FF112 is reset it produces a negative output signal on the reset side to condition $\overline{A}$184. During phase 2 of cycle 10 a clock pulse passes through $\overline{A}$184 to reset FF113. The resulting negative signal off the reset side of FF113 conditions $\overline{A}$187 so that during phase 4 of cycle 10 a clock pulse passes through this gate to reset FF114.

The timing diagram of FIGURE 3 illustrates the operation of the flip-flops which make up the command generator. As shown in FIGURE 3 FF101 is set at the beginning of time 42 and remains set until the beginning of time 52. FF102 is set two clock pulse periods after FF101 is set and is reset two clock pulse periods after FF101 is reset. The remaining flip-flops also remain set for four clock pulse periods with each succeeding flip-flop being set two clock pulse periods after the preceding one and reset two clock pulse periods after the preceding one.

From the above description it is obvious that each of the commands entering the bus 115 in FIGURE 2 occurs during a four-clock-pulse interval, this interval corresponding to the interval in which the associated flip-flop is set. These commands are subsequently mixed with phase pulses of a particular phase so that the commands are actually effectively applied to the registers for only one clock pulse period.

The circuits responsive to the commands generated by the command generators for producing the parity of a block of binary information are shown in block form in FIGURE 1.

In general terms, these circuits receive a value, shift it to the left and half-add it to itself to form a first result, shift the first result to the right and half-add it to itself to obtain a second result, and then shift the second result to the right and half-add it to the first result to obtain a third result. Every sixth binary bit of the third result beginning with the next to the low order bit is then sensed by a translator circuit to produce the parity of the binary value.

The value referred to in the preceding paragraph is actually the value obtained by forming the logical product of two binary numbers since the command generator always controls the circuits of FIGURE 1 to generate the logical product of two numbers entered into the circuits through the X register. That is, these circuits produce the logical product of two binary numbers and then generate the parity of the logical product.

These circuits include an operand register X, first and second sets of transfer gates X to X* and X to XS, first and second transfer storage registers X* and XS, first and second half-subtractors A*B*and AB, first and second difference-without-borrow storage registers A and A*, first and second borrow storage registers B and B*, a main subtractor, and first and second shift control circuits.

The X register is a 36-stage register capable of receiving and storing a 36-bit number or block of binary information. Data may be applied to the X register over bus 200 from the data processor memory or over bus 201 from the A register. The data on bus 200 is gated into the X register in response to the command Z to X appearing on lead 202. The commands Clear X and Z to X appearing on leads 202 and 203 are generated by memory controls (not shown) to first clear the register and then enter into it a value from memory. Data appearing on bus 201 is entered into the X register in response to the command A to X which appears on leads 146 and 169. Each stage of the X register is cleared or reset to the zero state in response to the command Clear X on leads 134, 145 or 167.

Signals representing the value stored in the X register are continuously applied to the X to X* gates by way of bus 204*a*. The output from each stage of the X register is double gated to the corresponding stage of the X to X* gates. In addition, the output from each stage of the X register is continuously applied to the next higher order stage of the X to X* gates.

As shown in detail in copending application A each stage of the X to X* gates contains three gates. The first set of gates is enabled by the command X to X* to permit the signals appearing on bus 204*a* to be gated onto the bus 205. The second set of gates is enabled by the command X' to X* to permit the complement of the value appearing on bus 204*a* to be gated to the bus 206. The third set of gates is enabled by the command X to X* (L1) to gate the value appearing on bus 204*a* to the bus 207. The commands appearing on leads 176, 122 and 152 energize the control element 208 so that it produces the commands to control the first, second, and third set of gates, respectively.

The X* register contains thirty-six binary stages for storing a 36-bit binary number. All stages of the register are cleared in response to the command Clear X* appearing on lead 120, 151 or 175. Transfer bus 205 connects the first set of X to X* gates to the set input terminals of the corresponding stage of the X* register. Transfer bus 206 connects the second set of X to X* gates to the set input terminals of the corresponding stages of the X* register. Transfer bus 207 connects the third set of X to X* gates to the set input terminals of the corresponding stages of the X* register.

As stated before, the signals representing the value in the X register appear continuously on transfer bus 204*a* and are applied to the X to X* gates. When one of the three sets of X to X* gates is conditioned by a signal from element 208 the signals appearing on bus 204*a* appear on one of the transfer busses 205 through 207 to set the X* register. From the above description it is obvious that the value entered into the X* register may be the same as the value in the X register, the complement of the value in the X register, or the value in the X register shifted one binary order to the left.

Signals representing the value in the X* register are continuously applied to corresponding stages of the A*B* half-subtractor by way of the transfer bus 209. Each stage of the A*B* half-subtractor also continuously receives signals from the corresponding stage of the A register by way of transfer bus 210. Transfer bus 211 continuously applies the output from the B register to the A*B* half-subtractor with a shift of one binary order to the left. Stages B00 through B34 are connected to stages 01 through 35 of the A*B* half-subtractor with stage B35 being connected to stage 00 of the half-subconctractor. This left shift is utilized in the multiply operation described in copending application A and may be ignored during parity generating operations since the B register is either set to contain binary ones in all stages or else set to contain binary zeros in all stages.

The A*B* half-subtractor is actually a three-input adder but because its logic is subtractive in nature it is referred to as a half-subtractor. Functionally speaking, the half-subtractor complements the value applied to it from X*, half-subtracts this value from the value applied to it from the A register, and then half-subtracts from this result the actual content of the B register left shifted one binary order. The difference bits resulting from the half-subtract operation are entered into the A* register over the bus 212*a* and the borrow bits are entered into the B* register over the bus 212*b*. As stated above, the A*B* half-subtractor sums the inputs from A, B, and X* and in this sense it is a true binary adder. However, the inputs from the B register are, in normally summing operations, the carries developed in a preceding add operation and the outputs of the half-subtractor are in the form of two sets of binary bits. One set of bits represents the difference (sum) without borrows (carries) and the other set of bits represents the borrows (carries). Thus, the A*B* half-subtractor differs from the conventional binary adder. The result of the half-subtract operation is gated from the A*B* half-subtractor to the A* and B* registers in response to the command Enter A*B* appearing on lead 129, 158 or 181.

The half-subtractor is fully disclosed in copending application A. Table I is a truth table for predicting the output of the half-subtractor when the B register contains all zeros. Table II is a corresponding truth table for predicting the output of the half-subtractor when the B register contains binary ones.

B = 0

| A | X* | A* | B* |
|---|---|---|---|
| 0 | 0 | 1 | 1 |
| 0 | 1 | 0 | 0 |
| 1 | 0 | 0 | 0 |
| 1 | 1 | 1 | 0 |

*Table I*

B = 1

| A | X* | A* | B* |
|---|---|---|---|
| 0 | 0 | 0 | 1 |
| 0 | 1 | 1 | 1 |
| 1 | 0 | 1 | 1 |
| 1 | 1 | 0 | 0 |

*Table II*

Assume for example that for a given stage of the half-subtractor the inputs are $B=0$, $A=0$ and $X^*=0$. When the command Enter A*B* is received the half-subtractor produces output signals to set the corresponding stages of the A* and B* registers to one.

On the other hand, if $B=1$, $A=0$ and $X^*=0$ the half-subtractor sets the corresponding stage of B* and resets the corresponding stage of A*.

For purposes of the present invention the borrows generated by the half-subtractor and applied to the B* register may be ignored since special commands either reset all stages of the B* register to zero or else set all stages of the B* register to one before the contents of the register are utilized by the other circuit elements.

Both the A* and B* registers are shown as having thirty-seven stages but only stages 00 through 35 are utilized during the parity generating operation. Neither A*36 nor B*36 receives input signals from the A*B* half-subtractor. The command Clear A*B* appearing on lead 128 or lead 182 resets all stages of each of the registers. The command Clear B* appearing on lead 135 clears the thirty-seven stages of the B* register. The command Set B* to 1 appearing on lead 144 sets stages B*00 through B*35 so that each stage contains a binary one. Stage B*36 is not set to 1 by the command Set B* to 1. The command Clear A* appearing on lead 157 resets all stages of the A* register to the zero state.

Signals representing the binary value in each stage of the X register are continuously applied to the corresponding stage of the X to XS gates over the bus 204*b*. The X to XS control element 213 is reset by the command Clear XS appearing on lead 130. When the command generator produces the command Set XS on lead 126 this command sets control element 213 and it produces the control signal X to XS. This control signal conditions each of the X to XS gates so that the binary values in stages 00 through 35 of the X register are applied to the corresponding stages of the XS register over the bus 214. The XS register has no storage ability but merely responds to the single gated signals on bus 214 to generate double gated signals on transfer bus 215. The double gated signals from each stage of XS are applied to the corresponding stage of the AB half-subtractor. In addition, each stage of XS is connected to the input of the corresponding stage of the A register by way of bus 216. It is obvious therefore that as long as the control signal X to XS is applied to the X to XS gates the content of the X register is applied to the AB half-subtractor and the A register. However, before the value can be entered into the A register the input transfer gates in the A register must be conditioned by the command XS to A appearing on lead 138.

The AB half-subtractor is similar to the A*B* half-subtractor previously described. In addition to receiving the output of XS each stage of the AB half-subtractor receives input signals from the A* and B* registers over the transfer busses 217 and 218. The content of A* is applied to the AB half-subtractor with a shift of two binary places to the right. That is, stages A*02 through A*35 are applied to stages 00 through 33 of the AB half-subtractor. Stage A*36, previously shown to contain zero, fills zeros into stages 34 and 35 of the half-subtractor.

The content of B* is applied to the AB half-subtractor with a shift of one binary order to the right so that the content of stages B*01 through B*35 is entered into stages 00 through 34 of the half-subtractor. B*36 previously shown to contain binary zero applies a zero value to stage 35 of the AB half-subtractor.

The AB half-subtractor half-subtracts the complement of the value in the X register from the value in the A* register and then half-subtracts the value in B* from this result. The command Enter AB appearing on lead 178 gates the difference values from stages 00 through 35 of the half-subtractor into stages 36, 37 and 0 through 33 of the A register. At the same time, the borrow digits generated by stages 00 through 35 of the AB half-subtractor are entered into stages 35, 36 and 0 through 33 of the B register.

Although the A register and B register are shown as having thirty-eight and thirty-seven stages, respectively, this showing is made only as an aid in correlating the present drawings with those shown in copending application A. Output signals from A36 and A37 and B35 are never utilized during the parity generating operation.

All stages of the A register and B register are cleared in response to the command Clear AB appearing on lead 119 or 177. The command Clear A appearing on lead 139 clears stages 00 through 35 of the A register. The command Set B to 1 appears on lead 174 to set all stages of the B register except stage 35 to the ones state. The command Set A to 1 appears on lead 161 to set stages A00 through A35 to the ones state.

Referring now to the main adder and borrow pyramid this unit functions as follows. The borrow pyramid continuously receives inputs from stages 00 through 35 of the A* and B* registers over transfer busses 217 and 218. Each borrow stored in the B* register is propagated to the left and end around until it finds a one in the A* register. For each position that the borrow propagates a one appears at that output of the borrow pyramid. This is illustrated as follows:

A* 0 0 1 0 1 1
B* 0 0 1 0 1 0
Borrow Pyramid 1 1 1 1 0 1

The main adder then half-subtracts the output of the borrow pyramid from the value contained in A*. This is illustrated as follows:

A* 0 0 1 0 1 1
Borrow Pyramid 1 1 1 1 0 1
Adder 1 1 0 1 1 0

Each stage of the main adder is connected by way of transfer bus 222 to the corresponding stage of the A register. Each time the command Adder to A appears on lead 148 or 168 each stage of the main adder applies a signal to the reset input terminal of the corresponding stage of the A register. As shown in copending application A the main adder produces a negative output signal from a given stage if that stage contains a binary one and produces a positive output signal if the stage contains a binary zero. Since the stages of the A register are either set or reset in response to positive signals the result produced by the main adder is entered into the A register as follows. First the command Set A to 1 sets stages 0 through 35 of the A register to the ones state. The command Adder to A then gates the content of the main adder to the A register and for each stage of the main adder that contains a binary zero the corresponding stage of the A register is reset. The stages of the A register remaining set after this operation represent the result of the subtraction operation.

While the parity of a binary number may be generated by performing a multitude of half-add operations with shift, the savings in hardware resulting therefrom is more than offset by the time required to generate the parity bit. As a practical matter it has been found best to perform three half-add and shift operations on a 36-bit binary number to obtain six bits representing the parity of the number. These bits are then translated to produce the single parity bit of the number.

After three half-add operations stages 1, 7, 13, 19, 25 and 31 of A* contain the six bits which may be translated to produce the parity of the number. The bits in these stages of the A* register are applied by way of transfer bus 223 to the parity translator 224.

The logic circuit for the parity translator 224 is shown in FIGURE 4. Consider first the pair of gates $\overline{A}250$ and $\overline{A}251$ which receive signals representing the parity bits in stages A*25 and A*31. If $A^*25=A^*31=0$ leads 252 and 253 are negative and leads 254 and 255 are positive. Thus, the outputs of $\overline{A}250$ and $\overline{A}251$ are negative if both A*25 and A*31 are zero. The outputs from these gates are also negative if $A^*25=A^*31=1$. In this case the positive signals on leads 252 and 253 block the gates. On the other hand, if $A^*25 \neq A^*31$ one of the gates is conditioned and the other is blocked thus producing a negative voltage at one output and a positive voltage at the other. If $A^*31=1$ and $A^*25=0$ then $\overline{A}250$ produces a positive output signal. If $A^*31=0$ and $A^*25=1$ then $\overline{A}251$ produces a positive output signal. From these observations it is obvious that the gates $\overline{A}250$ and $\overline{A}251$ both produce negative output signals only when the number of binary ones in stages A*31 and A*25 is even.

In like manner, $\overline{A}256$ and $\overline{A}257$ simultaneously produce negative output signals only when the number of binary ones in stages A*19 and A*13 is even and $\overline{A}258$ and $\bar{A}$259 simultaneously produce negative output signals only when the number of binary ones in stages A*07 and A*01 is even.

The outputs of $\bar{A}$250 and $\bar{A}$251 are connected to $\bar{A}$260 and $\bar{O}$261. The output of $\bar{O}$261 is conected to $\bar{A}$262. $\bar{A}$256 and $\bar{A}$257 are connected to both $\bar{A}$262 and $\bar{O}$263. The output of $\bar{O}$263 is connected to $\bar{A}$260.

$\bar{O}$261 inverts the output signals from $\bar{A}$250 and $\bar{A}$251 so lead 264 is negative only if the number of ones in stages A*31 and A*25 is odd. As stated before, leads 265 and 266 are negative simultaneous only when there is an even number of binary ones in stages A*19 and A*13. Therefore, $\bar{A}$262 produces a positive output signal only if there is an odd number of binary ones in A*31 and A*25 and an even number of binary ones in A*19 and A*13. At all other times it produces a negative output signal.

In like manner, $\bar{A}$260 produces a positive output signal only when there is an even number of binary ones in stages A*31 and A*35 and an odd number of binary ones in stages A*19 and A*13. At all other times it produces a negative output signal.

Output signals from $\bar{A}$260 and $\bar{A}$262 are applied to both $\bar{A}$267 and $\bar{O}$268. Thus, $\bar{O}$268 produces a negative output signal only if the number of binary ones in stages A*13, A*19, A*25 and A*31 is odd.

The output of $\bar{O}$268 is applied to $\bar{A}$269. This gate also receives negative signals from $\bar{A}$258 and $\bar{A}$259 if the number of binary ones in stages A*01 and A*07 is even. Therefore, $\bar{A}$269 produces a positive output signal only when the number of binary ones in stages A*01 and A*07 is even and the number of binary ones in stages A*13, A*19, A*25 and A*31 is odd.

$\bar{A}$267 is connected to the output of $\bar{O}$270 hence it receives a negative signal on lead 271 when there is an odd number of binary ones in A*01 and A*07. Since $\bar{A}$260 and $\bar{A}$262 simultaneously produce negative output signals only when the total number of binary ones in stages A*31, A*25, A*19 and A*13 is odd it becomes obvious that the output of $\bar{A}$267 is positive only when the total number of binary ones in stages A*31, A*25, A*19 and A*13 is odd and the number of binary ones in stages A*07 and A*01 is even.

The outputs of both $\bar{A}$267 and $\bar{A}$269 are connected to $\bar{O}$272 hence the output of this element becomes negative only when the total number of binary ones in stages A*31, A*25, A*19, A*13, A*07 and A*01 is odd. This output represents the parity bit of the original thirty-six bit binary number. The parity indication is applied to $\bar{A}$273 where it is gated with the command Generate Parity and a phase 3 clock pulse to produce a positive output signal if the parity of the original number is odd. Conversely, if the output of $\bar{A}$273 is negative at the time the Generate Parity and phase 3 signals are applied it indicates that there is an even number of binary ones and the parity of the original number is even.

As stated before, the commands produced by the command generator are each applied to the registers of FIGURE 1 for four consecutive pulse periods. As shown in copending application A these commands are each gated with clock or phase pulses such that the commands are each applied to the register stages for only one clock pulse period. Table III shows the time (cycle and phase) at which each command is effective and the flip-flop in the command generator which produces the command. The last digit of each number in the time column represents the phase pulse with which the command from the flip-flop is gated. For example, the command Enter A*B* is generated by flip-flops 102, 108 and 112. The output from each of these flip-flops is gated by a phase 3 clock pulse so that the command Enter A*B* is effective only during times 53, 83 and 103.

| Time | Command | Generator Flip-Flop |
|---|---|---|
| 42 | Cl X | memory |
| 43 | Z to X | memory |
| 44 | Cl X* | 101 |
| | Cl AB | 101 |
| 51 | X′ to X* | 101 |
| 52 | Cl A*B* | 102 |
| | Cl XS | 102 |
| 53 | Enter A*B* | 102 |
| | Set XS | 102 |
| 54 | | |
| 61 | | |
| 62 | Cl X | 104 |
| | Cl B* | 104 |
| 63 | Z to X | memory |
| 64 | Cl A | 105 |
| 71 | XS to A | 105 |
| 72 | Cl X | 106 |
| | Adder to A | 106 |
| 73 | A to X | 106 |
| | Set B* to 1 | 106 |
| 74 | Cl X* | 107 |
| 81 | X to X* (L1) | 107 |
| 82 | Cl A* | 108 |
| 83 | Enter A*B* | 108 |
| 84 | | |
| 91 | Set A to 1 | 109 |
| 92 | Cl X | 110 |
| | Adder to A | 110 |
| 93 | A to X | 110 |
| 94 | Cl AB | 111 |
| | Cl X* | 111 |
| 101 | Set B to 1 | 111 |
| | Enter AB | 111 |
| | X to X* | 111 |
| 102 | Cl A*B* | 112 |
| 103 | Enter A*B* | 112 |
| 104 | | |
| 111 | | |
| 112 | | |
| 113 | Generate Parity | 114 |

*Table III*

The following numerical example illustrates the operation of the present invention. Assume that operands M and N have the following values.

M=101010111111101111111011101010101111

N=101011101011100011111111101011011111

At time 42 the command Cl X appearing on lead 203 from the memory is gated to each stage of the X register to clear the register before the operand M is entered. At time 43 the command Z to X on lead 202 conditions the input gates of the X register and the operand M is entered therein.

At time 44 the command Cl X* appearing on lead 120 is effective to clear all stages of the X* register. At the same time, the command Cl AB on lead 119 clears the A and B registers.

At time 51 the command X′ to X* conditions the X to X* gates and the complement of operand M is gated from the X register into the X* register.

The command Cl A*B* appearing on lead 128 is gated to the A* nd B* registers at time 52 to clear the registers in preparation for receiving the output of the A*B* half-subtractor.

At time 53 the command Enter A*B* appearing on lead 129 gates the output of the half-subtractor into A* and B*. Since A and B are clear and X* contains the complement of operand M the half-subtractor operates according to truth Table I and the result is as follows.

| | |
|---|---|
| A | 000000000000000000000000000000000000 |
| B | 000000000000000000000000000000000000 |
| X′ | 010101000000010000000100010101010000 |
| A* | 101010111111101111111011101010101111 |

The same value entered into A* is also entered into B*. However, at time 62 the B* register is cleared by the command Cl B* appearing on lead 135 as this command is gated to the register stages. Therefore, the value in A* is applied to the borrow pyramid over bus 217 and zeros are applied to the carry pyramid over bus 218.

As explained above, each binary one applied to the borrow pyramid from B* effectively searches to the left and produces a borrow signal for each stage to the left up to and including the stage of the A* register containing a binary one. Since B* is set to contain all zeros there are no borrow signals produced by the borrow pyramid and the operation is illustrated as follows.

```
        A* 101010111111101111111011101010101111
        B* 000000000000000000000000000000000000
   ----------------------------------------------
Borrow
Pyramid    000000000000000000000000000000000000
```

Since the main adder half subtracts the output of the borrow pyramid from the output of A*, the main subtractor output is determined as follows.

```
        A* 101010111111101111111011101010101111
Borrow
Pyramid    000000000000000000000000000000000000
   ----------------------------------------------
     Adder 101010111111101111111011101010101111
```

Thus, beginning at time 62 the main adder produces signals representing the operand M which was originally introduced into the X register. The preceding operations have merely transferred the operand M from the X register to the main adder. At time 72 the command Adder to A appearing on lead 148 gates this operand from the adder onto bus 222 and it is transferred to the A register.

As shown in Table III, the command Cl XS on lead 130 clears control element 213 at time 52 thus blocking the signal X to XS which normally conditions the X to XS gates. At time 53 the command Set XS sets element 213 and it produces the signal X to XS thus conditioning the X to XS gates.

At time 62 the command Cl X appearing on lead 134 clears the X register thus preparing it to receive the operand N. At time 63 the memory controls produce the command Z to X on lead 202 thus transferring the second operand N into the X register from bus 200.

The command Cl A appears on lead 139 and the A register is cleared at time 64. During the next phase which is time 71 the command XS to A on lead 138 gates the contents of XS to the A register. Since X contains operand N and the X to XS gates are conditioned to apply the value in X to XS, it is seen that the value N is entered into A at time 71 and the pattern of zeros and ones in the register is as follows.

```
A=N=101011101011100011111111101011011111
```

As explained above, the output of the main adder is applied to the A register at time 72 and resets each stage of the register if the output of the corresponding stage of the adder is zero.

```
    A 101011101011100011111111101011011111
Adder 101010111111101111111011101010101111
  ----------------------------------------
    A 10101010101110001111011101010001111
```

The binary value standing in the A register at the end of time 72 is the logical product of the operands M and N. That is, at this time the A register contains a binary one in each order where the corresponding orders of M and N are both ones and contains a binary zero in each order where the corresponding order to either M or N is a zero. The parity of this value is determined in a sequence of operations as follows.

The X register is cleared at time 72 in response to the command Clear X on lead 145. At time 73 the binary value in the A register is entered into the X register over bus 201 in response to the command A to X on lead 146. The A register is not cleared when this transfer takes place so the logical product is stored in both the A and X registers.

At time 73 the B* register is set to all ones in response to the command appearing on lead 144 and at time 74 the command Clear X* appearing on lead 151 clears the X* register in preparation for forming the logical sum of the value in A and twice the value in X.

Next, the command generator generates the command X to X* (L1) on lead 152 and the control element 208 produces an output signal to condition the X to X* gates. At time 81 the X to X* gates are conditioned and the value standing in the X register is gated on to the bus 207 and into the X* register. Note that this transfer takes place with a shift of one binary order to the left so that the high order bit of the X register is lost during the transfer operation. Because of the shift to the left a binary zero is stored in the low order position of the X* register.

Since the outputs of the A, B and X* registers are continuously applied to the A*B* half-subtractor the half-subtractor begins to generate a result. According to Table I this result is as follows.

```
A  10101010101110001111011101010001111
B  000000000000000000000000000000000000
X* 010101010111000111110111010100011110
   ------------------------------------
A* 000000000110110111100110000001101110
   ↑ ↑ ↑ ↑ ↑ ↑ ↑ ↑ ↑ ↑ ↑ ↑ ↑ ↑ ↑ ↑ ↑ ↑
```

At time 82 the command appearing on lead 157 clears the A* register and at time 83 the command Enter A*B* on lead 158 gates the ouptut of the A*B* half-subtractor to the A* and B* registers. The output of the A*B* half-subtractor has no effect on the B* register since this register was set to ones at time 73.

The result now contained in the A* register is the result of half-adding the logical product to twice the logical product. Note that the next to the low order stage of the A* register contains a binary one. This indicates that the parity of the two low order bits of the logical product is even. This is correct since the two low order bits of the logical product are both ones. In like manner, each alternate stage of the A* register contains a binary bit indicating the parity of a succeeding pair of bits in the logical product with the high order bit of A* indicating the parity of the high order pair of bits in the logical product.

The values in the A* and B* registers are applied to the borrow pyramid over busses 217 and 218 and the borrow pyramid produces borrows as follows.

```
        A* 000000000110110111100110000001101110
        B* 111111111111111111111111111111111111
   ----------------------------------------------
Borrow
Pyramid    111111111111111111111111111111111111
```

The output of the borrow pyramid is combined with the output of the A* register in the main adder to produce the following result.

```
     A*  000000000110110111100110000001101110
Borrow
Pyramid  111111111111111111111111111111111111
   ----------------------------------------------
Adder    111111111100100100001100111110010001
```

At time 91 the command appearing on lead 161 causes each stage of the A register to be set to the ones state. At time 92 the command Adder to A appearing on lead 168 gates the output of the main adder onto transfer bus 222 from whence it is applied to the A register. This resets each stage of the A register where the corresponding output from the main adder is zero. This operation is illustrated as follows.

```
    A  111111111111111111111111111111111111
Adder  111111111100100100001100111110010001
   ----------------------------------------
    A  111111111100100100001100111110010001
```

At time 92 the command Clear X on lead 167 clears each stage of the X register and at time 93 the command A to X on lead 169 gates the contents of the A register into the X register from the bus 201.

The next step involves shifting the content of A* to the right two positions and half-adding it to the content of the X register with the result being placed in the A and B registers. At time 94 the command Clear AB appearing on lead 177 clears both the A and B registers. At time 101 the command Set B to 1 appearing on lead 174 sets stages 00 through 34 and 36 of the B register to 1. Control element 213 was set at time 53 and has remained set since that time thus conditioning the X to XS gates and allowing the value in the X register to be applied to the AB half-subtractor. Each stage of the X register is applied to the corresponding stage of the AB half-subtractor. The output from A* is applied to the AB half-subtractor with a shift of two binary places to the right, zeros being entered into stages 34 and 35 of the half-subtractor from stage 36 of the A* register. The content of B* is applied to the AB half-subtractor with a shift of one binary place to the right so that the zero in B*36 is entered into stage 35 and ones are entered into stages 00 through 34 of the half-subtractor. At time 101 the command Enter AB on lead 178 gates the output of the half-subtractor onto bus 219 and it is applied to the A and B registers. Since the B register is set to all ones by the command on lead 174 the output of the AB half-subtractor has no effect on this register. The outputs from stages 35 through 02 of the half-subtractor are applied to stages 33 through 00, respectively, while the outputs of stages 01 and 00 are applied to stages 37 and 36, respectively, of the A register. Since stages 34 and 35 of the A register were cleared by the command on lead 177 and no value is entered therein from the half-subtractor these stages contain binary zeros. The operation of the AB half-subtractor is illustrated as follows.

```
A* 000000000000110110111100110000011011
B* 011111111111111111111111111111111111
X' 111111111100100100001100111110010001
---------------------------------------
AB 011111111100010010110000001110001010
```

After the output of the AB half-subtractor is right shifted two binary orders and entered into the A register the contents of stages A35 through A00 is as follows.

```
000111111111000100101100000011100010
    ↑     ↑     ↑     ↑     ↑     ↑
```

The content of the A register at this time is an indication of the parity of specific groups of bits of the logical product. The next to the low order stage A01 contains a binary one indicating that there is an even number of binary ones in binary orders $2^2$ through $2^5$ of the logical product. In like manner, stages A07, A25 and A31 contain ones thus indicating an even number of binary ones in orders $2^8$ through $2^{11}$, $2^{26}$, through $2^{29}$, and $2^{32}$ through $2^{35}$, respectively, of the logical product. On the other hand, stages A13 and A19 contain binary zeros thus indicating an odd number of binary ones in stages $2^{14}$ through $2^{17}$ and $2^{20}$ through $2^{23}$, respectively, of the logical product.

The next step in the sequence of operations half-adds the first result now in the X register to the shifted second result now contained in the A register. At time 94 the command Clear X* on lead 175 clears the X* register. At time 101 the the command X to X* on lead 176 conditions control element 208 which in turn produces a signal to condition the X to X* gates. This gates the content of the X register from bus 204*a* through the X to X* gates onto bus 205 and into the X* register. Thus, the content of each stage in the X register is entered into the corresponding stage of the X* register. At time 102 the command Clear A*B* appearing on lead 182 clears both the A* and B* registers.

The A*B* half-subtractor half-subtracts the complement of the value in the X* register from the value in the A register and then half-subtracts the content of the B register from this result and at time 103 the command Enter A*B* appearing on lead 181 gates the results into the A* and B* registers. The third result produced by this operation is illustrated as follows.

```
A  000111111111000100101100000011100010
B  111111111111111111111111111111111111
X* 111111111100100100001100111110010001
---------------------------------------
A* 110000000011100000100000111101110011
       ↑     ↑     ↑     ↑     ↑     ↑
```

The following observations may be made from examining the content of the A* register. Stage A*01 contains a binary one thus indicating an even number of ones in the six low orders positions of the logical product. Stages A*07, A*13, A*19 and A*31 contain binary zeros indicating the second, third, fourth and sixth groups of six binary bits in the logical product each contain an odd number of binary ones. Finally, stage A*25 contains a binary one thus indicating that the fifth group of six binary bits in the logical product contains an even number of binary ones.

The output signals from stages A*01, A*07, A*13, A*19, A*25 and A*31 are applied to the translator circuit 224 over the transfer bus 223.

Since A*01 contains a binary one and A*07 contains a binary zero both inputs to $\overline{A}$259 are negative and the gate produces a positive output signal which blocks $\overline{A}$269. A*31 contains a binary zero and A*25 contains a one so both inputs to $\overline{A}$251 are negative and the gate produces a positive output signal which is inverted at $\overline{O}$261 and applied to $\overline{A}$262. Both A*13 and A*19 contain binary zeros so gates 256 and 257 are both blocked and apply negative output signals to $\overline{A}$262. With all inputs negative $\overline{A}$262 produces a positive output signal to block $\overline{A}$267.

With $\overline{A}$267 and $\overline{A}$269 both blocked all inputs to $\overline{O}$272 are negative and it produces a positive output signal. Therefore, at time 113 when the Generate Parity command and the phase 3 clock pulse are applied to $\overline{A}$273 it continues to produce a negative output signal. This negative signal indicates that the parity of the logical product of M and N is even. Inspection of the logical product shows that in fact it does contain an even number of binary ones.

While the present invention has been described with reference to the registers shown in copending application A, the present invention is not limited to the specific registers shown therein. For example, adders employing additive rather than subtractive logic may be used. Obvious modifications within the spirit and scope of the invention will become apparent to those skilled in the art. It is intended therefore to be limited only by the scope of the appended claims.

I claim:

1. In a parity generator for generating the parity of an N-bit binary number, the combination comprising: first half-adder means; result storage means responsive to said half-adder means for storing the results of half-add operations performed thereby; first and second register means for storing said N-bit binary number; means for applying the content of said first register means to said half-adder without shift; and means for applying the content of said second register means to said half-adder with a shift of one binary place to the left whereby alternate stages of said result storage means receive and store the parity bits of succeeding pairs of said N-bit number.

2. The combination as claimed in claim 1 and further comprising: means for transferring the result stored in said result storage means to said second register means; second half-adder means; means for applying the content of said second register means to said second half-adder; means for applying the content of said result storage means to said second half-adder with a shift of two binary orders to the right with respect to the orders to which the content of said second register means is applied, said first register means being connected to the output of said second adder means whereby it registers the parities of predetermined groups of said N bits.

3. The combination as claimed in claim 2 and further comprising: means for applying the content of said second register means to said first half-adder means without shift and the content of said first register means to said first half-adder means with a shift of two binary orders to the right with respect to the order of said second register means whereby said first half-adder means produces a number containing at least $N/6$ parity indicating bits.

4. The combination as claimed in claim 3 and further comprising means responsive to at least $N/6$ stages of said result storage means for generating a signal representing the parity of said N-bit binary number.

5. The combination as claimed in claim 1 wherein said half-adder means comprises a full binary adder having first and second sets of outputs for representing respectively, the difference without borrows and the borrows resulting from the full addition of binary signals applied to its inputs, said adder having first and second sets of operand inputs for receiving said N-bit binary number and said shifted number, and a third set of inputs for receiving borrow signals; and means for applying signals representing zero borrows to said third set of inputs.

6. A device for generating the parity of a binary number, said device comprising: first, second and third register means; first and second half-adder means; means for entering said binary number into said second and third register means; means for applying said binary number in said second register means to said first half-adder means without shift and applying said binary number in said third register means to said first half-adder with a shift of one binary order to the left to thereby develop a first result number; means for entering said first result number into said first register means; means for complementing said first result number and entering it into said third register means; means for applying said first result number from said first register means to said second half-adder means and applying said complemented first result number from said third register means to said second half-adder means, said first result number being applied with a shift of two binary orders to the right with respect to said complemented number to thereby develop a second result number; means for entering said second result number into said second register means; means for applying said complemented first result number in said third register means to said first half-adder and said second result number in said second register means to said first half-adder, said second result number being applied with a shift of two binary orders to the right with respect to said complemented first result number to thereby develop a third result number.

7. A device as claimed in claim 6 and further comprising: means for entering said third result number into said first register means; and means for sensing predetermined orders of said third result number and generating the parity of said predetermined orders, said parity also being the parity of said binary number.

8. A parity generator comprising: first half adder means responsive to a number and twice the value of said number for producing a first result; second half adder means; means for applying said first result to said second half adder means without shift; means for applying said first result to said second half adder means with a shift of two binary orders to the right, said second half adder means combining said first result and said first shifted result to produce a second result; means for applying said first result to said first half adder means without shift; and means for applying said second result to said first half adder means with a shift of two binary orders to the right whereby said first half adder means produces a third result wherein the next to the low order bit of said third result indicates the parity of six bits of said binary number.

9. A parity bit generator as claimed in claim 8 wherein every sixth bit of said third result counting from said next to the low order bit provides a further indication of the parity of a portion of the bits of said binary number, and translator means responsive to said next to the low order and succeeding sixth bits of said third result for producing a signal indicating the parity of said binary number.

10. Means for generating a set of binary bits including a group of parity bits, each of said parity bits representing the parity of a pair of bits of a multi-bit binary number, the two bits of said pair being displaced from each other by N binary orders, said means comprising: half-adder means having at least first and second sets of inputs; result storage means responsive to said half-adder means for storing the difference without borrow bits resulting from the half add operations performed by said half-adder means; means for applying said multi-bit binary number to said first set of inputs without shift; and means for applying said multi-bit binary number to said second set of inputs with a shift of N binary orders whereby every Nth stage of said result storage means receives and stores the parity of one of said pairs.

11. A parity bit generator comprising: carry-store type adder means for producing a series of difference-without-borrow bits; storage means for storing binary numbers; means interconnecting said adder means and said storage means; and cycle control means for controlling transfers between said storage means and said adder means, said cycle control means including first control means for controlling the transfer of an N-bit binary number to said adder without shift and with a shift of X orders in a predetermined direction whereby said adder produces a series of difference-without-borrow bits, said series having at least $N/2$ bits each of which represents the parity of a pair of bits displaced from each other by X orders in said N-bit number.

References Cited by the Examiner

UNITED STATES PATENTS

| | | | |
|---|---|---|---|
| 3,069,657 | 12/62 | Green | 235—153 |
| 3,114,130 | 12/63 | Abramson | 235—153 |

ROBERT C. BAILEY, *Primary Examiner.*

MALCOLM A. MORRISON, *Examiner.*